US008807614B2

(12) United States Patent
Xu et al.

(10) Patent No.: US 8,807,614 B2
(45) Date of Patent: Aug. 19, 2014

(54) GRIPPING DEVICES

(75) Inventors: Yangsheng Xu, Hong Kong (CN); Tin Lun Lam, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 119 days.

(21) Appl. No.: 13/556,775

(22) Filed: Jul. 24, 2012

(65) Prior Publication Data

US 2013/0025956 A1 Jan. 31, 2013

Related U.S. Application Data

(60) Provisional application No. 61/511,800, filed on Jul. 26, 2011.

(51) Int. Cl.
*B62B 1/18* (2006.01)

(52) U.S. Cl.
USPC ............. 294/201; 294/198; 192/136; 180/8.6

(58) Field of Classification Search
USPC ............ 180/8.1, 8.6; 294/198, 201, 202, 203; 192/136
See application file for complete search history.

(56) References Cited

U.S. PATENT DOCUMENTS

| 3,759,563 | A | * | 9/1973 | Kitamura | 294/198 |
| 4,194,542 | A | * | 3/1980 | Eriksson | 144/24.13 |
| 4,759,169 | A | * | 7/1988 | Schneiders | 53/530 |
| 4,981,163 | A | * | 1/1991 | Westlund | 144/4.1 |
| 5,613,722 | A | * | 3/1997 | Fandrich et al. | 294/199 |
| 8,650,847 | B2 | * | 2/2014 | Snell | 56/340.1 |
| 2003/0130759 | A1 | * | 7/2003 | Kesil et al. | 700/190 |
| 2005/0281661 | A1 | * | 12/2005 | Kesil et al. | 414/744.5 |
| 2013/0299046 | A1 | * | 11/2013 | Helenius | 144/343 |

OTHER PUBLICATIONS

Kushihashi, et al; Development of Structure of Measuring Grasping Power to Control Simplification of Tree Climbing and Pruning Robot,Woody-1; Proceedings of JSME Conference on Robotics and Mechatronics; 2006.
Kawasaki, et al; Novel Climbing Method of Pruning Robot, Proceedings of the SICE Annual Conference; 2008.
Aracil, et al; a Climbing Parallel Robot; A Robot to Climb Along Tubular and Metallic Structures; IEEE Robotics & Automation Magazine; 2006.
Spenko, et al; Biologically Inspired Climbing with a Hexapedal Robot; Journal of Field Robotics; 2008.
Haynes; Rapid Pole Climbing with a Quadrupedal Robot; IEEE International Conference on Robotics and Automation; 2009.
Fu, et al; Development of a Wall Climbing Robot with Wheel-Leg Hybrid Locomotion Mechanism; IEEE International Conference on Robotics and Biomimetics; 2007.

(Continued)

*Primary Examiner* — Kevin Hurley
(74) *Attorney, Agent, or Firm* — Knobbe Martens Olson & Bear LLP (57) ABSTRACT

A gripping device comprising: a house; at least one gripper configured with at least one claw, the claw being configured with a pair of first phalanxes linked to the house at a first joint, and a pair of second phalanxes linked to the first phalanxes at a second joint; a first actuator arranged on the first joint; a second actuator arranged on the second joint; and a motor configured to enable the first and the second actuators co-operate so as to push the second phalanxes off a gripping substrate, or to push the second phalanxes back to the gripping substrate.

8 Claims, 4 Drawing Sheets

(56) References Cited

OTHER PUBLICATIONS

Pack, et al; A Rubbertuator-Based Structure-Climbing Inspection Robot; IEEE International Conference on Robotics and Automation; 1997.

Zhang, et al; Effective Pneumatic Scheme and Control Strategy of a Climbing Robot for Class Wall Cleaning on High-rise Buildings; International Journal of Advanced Robotic Systems, vol. 3, No. 2; 2006.

Hirose, et al; Disk Rover: A Wall-Climbing Robot Using Permanent Magnet; IEEE/RSJ International Conference on Intelligent Robots and Systems; 1992.

Longo, et al., SCID—A non-actuated robot for walls exploration; IEEE/ASME International Conference on Advanced Intelligent Mechatronics Proceedings; 2001.

Kotay, et al.; the Inchworm Robot: A Multi-Functional System; Autonomous Robots 8, 53-69; 2000.

Unver, et al.; Geckobot: A Gecko Inspired Climbing Robot Using Elastomer Adhesives; Proceedings of the IEEE International Conference on Robotics and Automation; 2006.

Xu, et al.; Actuation Compensation for Flexible Surgical Snake-like Robots with Redundant Remote Actuation; IEEE International Conference on Robotics and Automation; 2006.

Camarillo, et al.; Mechanics Modeling of Tendon-Driven Continuum Manipulators; IEEE Transactions on Robotics, vol. 25, No. 6; 2008.

McMahan, et al.; Field Trials and Testing of the OctArm Continuum Manipulator; IEEE International Conference on Robotics and Automation; 2006.

Chen, et al.; Development and kinematic analysis of a silicone-rubber bending tip for colonoscopy; IEEE International Conference on Intelligent Robots and Systems; 2006.

Immega, et al.; The KSI Tentacle Manipulator; IEEE International Conference on Robotics and Automation; 1995.

Robinson, et al.; Continuum Robots—A State of the Art; IEEE International Conference on Robotics & Automation; 1999.

Gravagne, et al.; Manipulability, Force, and Compliance Analysis for Planar Continuum Manipulators; IEEE Transactions on Robotics and Automation, vol. 18, No. 3; 2002.

Walker, et al.; Extension versus Bending for Continuum Robots; International Journal of Advanced Robotic Systems, vol. 3, No. 2; 2006.

* cited by examiner

GRIPPING DEVICES

CROSS REFERENCE TO RELATED APPLICATIONS

This application claims priority under 35 U.S.C. §119(e) to U.S. Provisional Patent Application No. 61/511,800 filed Jul. 26, 2011, which is incorporated herein by reference in its entirety.

BACKGROUND

Preventing trees from falling is important to protect human life and property in urban areas. Most trees in urban areas require regular maintenance. To reach upper parts of a tree to perform such maintenance, workers need to climb the tree. However, tree climbing is dangerous, and thus a tree-climbing robot is developed to assist or replace tree climbers in their work.

Several robots have been designed to climb trees. WOODY2006 as proposed by Y. Kushihashi, et al. in "Development of Tree Climbing and Pruning Robot, Woody-1-Simplification of Control using adjust Function of Grasping Power" is a climbing robot designed to replace human workers in removing branches from trees. The robot climbs by encircling the entire tree trunk. The size of the robot is thus proportional to the circumference of the trunk. WOODY2006 avoids branches by turning its body and opening the gripper, but it requires an almost straight tree trunk.

Kawasaki 2008 as proposed by H. Kawasaki, et al., "Novel climbing method of pruning robot" also developed a climbing robot for tree pruning. It uses a gripping mechanism inspired by lumberjacks, and uses a wheel-based driving system for vertical climbing. It encircles the entire tree trunk for fastening on a tree. It cannot avoid branches when the fastening mechanism cannot be opened.

SUMMARY OF THE INVENTION

In one aspect, there is provided a ripping device comprising:
 a house;
 at least one gripper configured with at least one claw, the claw being configured with a pair of first phalanxes linked to the house at a first joint, and a pair of second phalanxes linked to the first phalanxes at a second joint;
 a first actuator arranged on the first joint;
 a second actuator arranged on the second joint; and
 a motor configured to enable the first and the second actuators co-operate so as to push the second phalanxes leave off from a gripping substrate, or to push the second phalanxes back to the gripping substrate.

According to one embodiment, the motor may comprise a linear motor configured to have an extension operation stage and a contraction operation stage, wherein, the linear motor operates to enable the first and the second actuators co-operate so as to push the second phalanxes leave off from a gripping substrate in the extension operation stage, or to push the second phalanxes back to the gripping substrate in the contraction operation stage. For example, the first actuator may comprise a first pre-compressed spring and the second actuator may comprise a second pre-compressed spring. During the extension operation stage, the linear motor compresses the first pre-compressed spring and releases the second pre-compressed spring so as to push the second phalanxes leave off from the gripping substrate; and during the contraction operation stage, the linear motor compresses the second pre-compressed spring and releases the first pre-compressed spring so as to push the second phalanxes back to the gripping substrate.

In a further aspect, there is provided a ripping device comprising:
 a house;
 at least one first phalanx linked to the house at a first joint;
 at least one second phalanx linked to the first phalanx at a second joint, wherein there is provided a first pre-compressed spring and a second pre-compressed spring in the first and the second joint, respectively; and
 a linear motor arranged on the house,
 wherein the linear motor is configured to further compress the first spring and release the second spring so as to push the second phalanx leave off from a gripping substrate during the linear motor extends, and to compress the second spring and release the first spring so as to push the second phalanx back to the gripping substrate during the linear motor contracts.

In a further aspect, there is provided a manipulator, which may comprise:
 a plurality of plates;
 a plurality of springs arranged to pass though the plates;
 a plurality of actuators mounted in one of the plates, each of the actuators includes a motor to control lengths of the third springs between each two of the plates independently, such that the manipulator performs bending and extension motions.

According to one embodiment, the springs and the actuators co-operate such that the manipulator performs said bending and extension motions in a plurality of Degree of Freedom (DOF). For example, there may be 3 springs and 3 actuators, and the actuators cooperate with the springs such that the manipulator acts in 3 Degree of Freedom (DOF). In addition, the manipulator may further comprise a plurality of passive spacers arranged at middle of the manipulator to ensure the springs in constant distance through the entire manipulator.

DETAILED DESCRIPTION OF THE PREFERRED EMBODIMENTS

Figure 1:
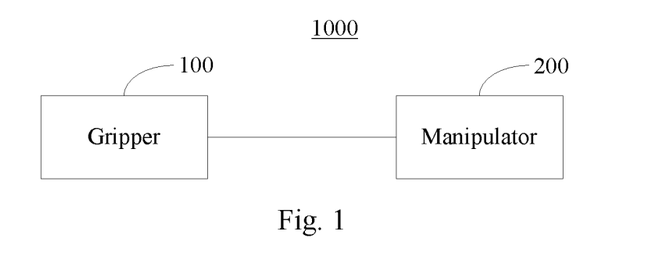
FIG. 1 illustrates functional blocks for a gripping device according to one embodiment of the present application.

FIG. 1 illustrates functional blocks for a gripping device 1000 according to one embodiment of the present application. As shown in FIG. 1, the structure of the gripping device 1000 comprises two parts, i.e. a gripper 100, such as an omni-directional tree gripper, and a continuum manipulator 200. For example, there may be two grippers 100, each of which has a first end and a second end. The first end is connected to ends of the continuum manipulator 200, respectively. The grippers 100 can adhere on a tree surface tightly while the continuum manipulator 200 acts as maneuver mechanism to move the second end of the gripper to a target position. Hereinafter, the configurations of the gripper 100 and the manipulator 200 will be discussed in reference to FIGS. 2 and 3, respectively.

Omni-Directional Tree Gripper 100

Figure 2A:
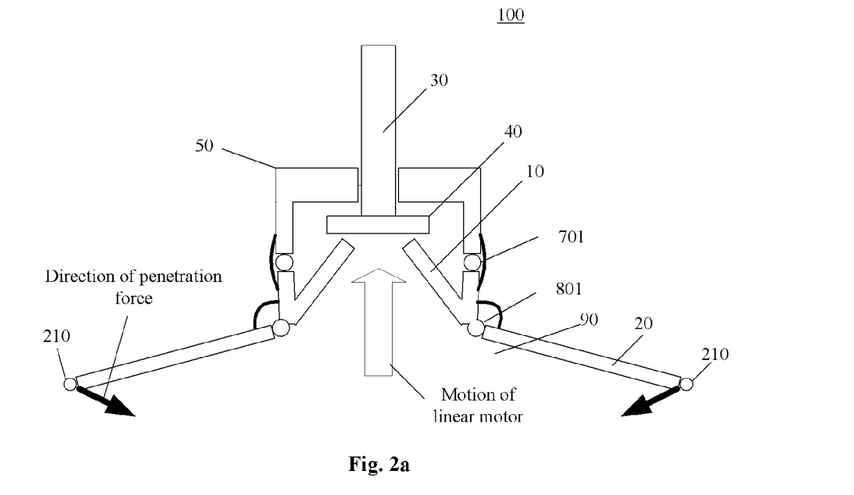
FIG. 2a illustrates a cross-sectional view of the gripping device (contraction operation stage) as shown in FIG. 1.
Figure 2B:
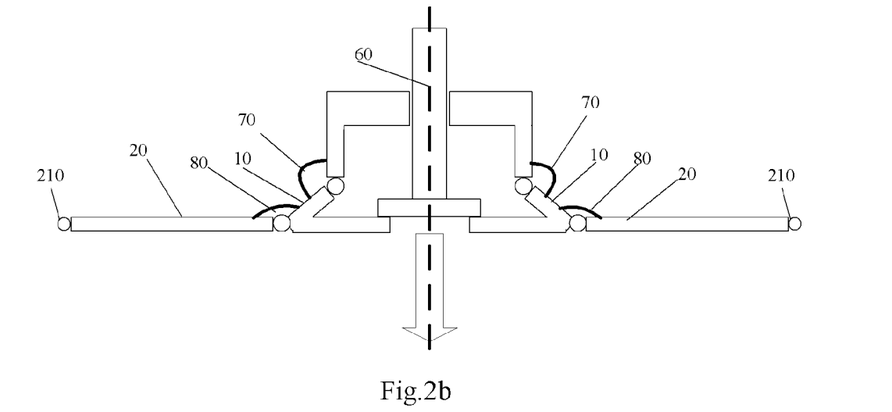
FIG. 2b illustrates a cross-sectional view of the gripping device (extension operation stage) as shown in FIG. 1.

FIG. 2a illustrates a cross-sectional view of the gripping device 100 during the contraction operation stage according to one embodiment of the present application, and FIG. 2b illustrates a cross-sectional view of the gripping device 100 during the extension operation stage according to one embodiment of the present application. There are many innovative approaches to provide adhesive force such as vacuum suction, magnetic attraction, elastomeric adhesive, electro adhesive and fibrillar adhesive. Those methods work well on urban settings such as vertical walls and glass windows that are smooth and flat. However, they are not applicable on tree surface, as the nature of trees is totally different from urban settings. Claw climbing method is widely used in tree living animals such as squirrels and birds. Through an observation of the tree living animals, the claw gripping is reliable on a tree surface. As a result, the claw gripping method is adopted to provide adhesive force. The design of the proposed gripper 100 aims at providing adhesive force on a wide range of gripping curvature such that the gripper 100 is able to adhere on tree trunks and branches. The gripper 100 is designed to be omni-directional along its principal axis 60 so that no additional orientation actuator and control is needed about its principle axis and hence keeps the device 1000 in lightweight and simple.

The gripper 100 may, for example, comprise four claws equally separated by 90 degrees. As shown in FIGS. 2a and 2b, each claw is formed by two parts (a first Phalanx 10 and a second Phalanx 20) and has surgical suture needles 210 installed at the tip. The adhesive force of the gripper is generated by the spine penetration.

The claws adopt two bar linkages mechanism to generate optimal direction of acting force. As shown in FIG. 2, all claws in a gripper are actuated by a linear motor 30 arranged on a house 50. A pushing plate 40 is mounted at the end of the linear motor 30. When the linear motor 30 extends, the plate 40 pushes all the phalanxes 10 and 20 and hence makes the phalanxes 10 and 20 upward. A pair of first pre-compressed springs 70 arranged on a pair of first joints 701 (joints A, one for each spring 70) are further compressed. A pair of springs 80 arranged on a pair of second joints 801 (joints B, one for each spring 80) are released at the same time. This motion pulls the spines off from a gripping surface 90 like a tree trunk. When the linear motor 30 contracts, the compressed springs 70 and 80 on joints A and B generate a force to push claws back to the gripping surface and at the same time the springs on joint B will further be compressed. Since the gripping force is generated by the preloaded springs only, the static gripping with zero energy consumption can be achieved. The constant force spring (a flat spiral spring) is adopted to ensure that the force is independent to the claw traveling angle. In addition, since the moving mechanism of each claw is independent, it allows the claws to travel in different angle. This ensures that all of the claws penetrate into the gripping substrate, even if it has an irregular shape, to generate the maximum force.

Manipulator 200

There are many types of continuum manipulators, such as wire-driven and pneumatic-driven. Most of them are able to bend in any direction and some are even able to extend to a certain extent. Most current research uses the continuum structure in robot arms, but few researchers have realized that it can also be applied to maneuvering. The continuum mechanism is a compliant structure, as it does not contain fixed joints. In one embodiment, the continuum mechanism may utilize the same or similar physical structure as disclosed by G. Robinson, J. B. C. Davies. Please refer to "Continuum Robots—A State of the Art", Proceedings of the 1999 IEEE International Conference on Robotics and Automation, Detroit, Mich., May 1999.

Its inherent passive compliance is particular benefit for maneuvering in an arboreal environment, as it can often eliminates the need for complex force sensing and feedback control. For climbing purposes, the manipulator must be compact and lightweight. There are many types of continuum manipulator, but none of them fulfills all of these requirements. Existing continuum manipulators need to connect to large external boxes that contain wire, drivers, motors, or air pumps. Although some pure wire-driven continuum manipulators have the potential to be more compact and lightweight, the manipulators are not extendable. Extendibility is important.

Due to these limitations, a novel design of continuum manipulator 200 to maneuver with both bendable and extendable functionalities is proposed. The proposed continuum manipulator is a self-contained module that actuators 207 are integrated and hence no external control box is required. It makes the proposed continuum manipulator 200 compact and lightweight. In addition, the special driving mechanism allows superior extension ability that the existing designs cannot achieve.

Figure 3A:
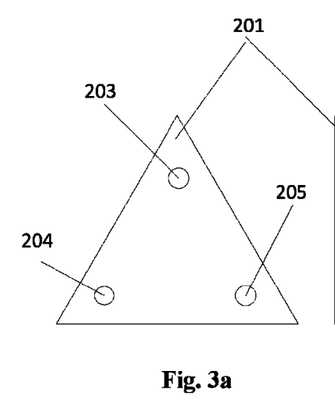
FIG. 3a illustrates a top view of the proposed manipulator as shown in FIG. 1.
Figure 3B:
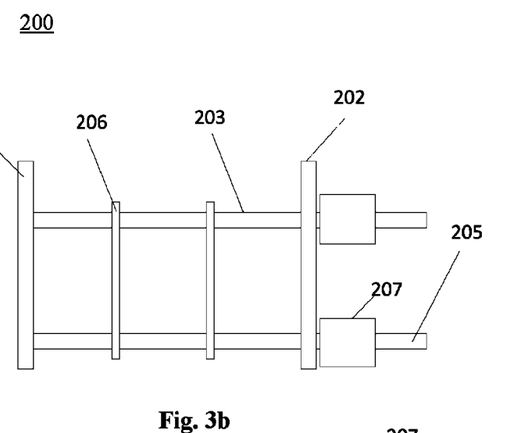
FIG. 3b illustrates a side view of the proposed manipulator as shown in FIG. 1.
Figure 3C:
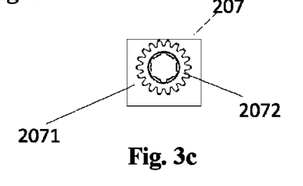
FIG. 3c illustrates an exemplary configuration for the actuator in the proposed manipulator as shown in FIG. 3b.

FIGS. 3a and 3b shows the proposed manipulator 200 according to one embodiment of the present application. It is formed by, for example, three mechanical springs 203, 204 and 205 that are connected in parallel. The distance between the center of the continuum manipulator 200 and springs are equal and the springs are equally separated by 120 degrees. One end of spring is fixed on a plate 201, while the other end does not have any fixed connection. The springs pass through a plate 202 in which there is arranged three actuators 207. As shown in FIG. 3c, each of actuators 207 includes one motor 2071 (for example, DC motor) to control the length of springs between two of the plates independently. Through the control of the length of each spring, the continuum manipulator 200 can perform bending and extension motions.

Commonly, the number of actuators required in each section of continuum manipulator is more than the number of admissible degrees of freedom. However, in the proposed structure, only three (for example) actuators are used but it can provide 3 Degree of Freedom (DOF). This structure provides maximal DOF with minimal actuators. The actuation mechanism is similar to rack and pinion mechanism which allows unlimited extension of the continuum manipulator theoretically. In practice, it is limited by the length of the springs only. The spring can be treated as a bendable rack. The spring should only be allowed to bend in any direction but not able to compress or extend so as to keep a constant gap distance for pinion 2072 (FIG. 3c) to drive. On top of that, keeping the springs in constant distance through the entire manipulator is important to keep a uniform shape. As a result, several passive spacers 206 are installed at the middle of the manipulator to constrain the distance among springs. The maximal distance between constraint plates are constrained by wires.

Motion of Device

A. Locomotion of the Device 1000

Figure 4:
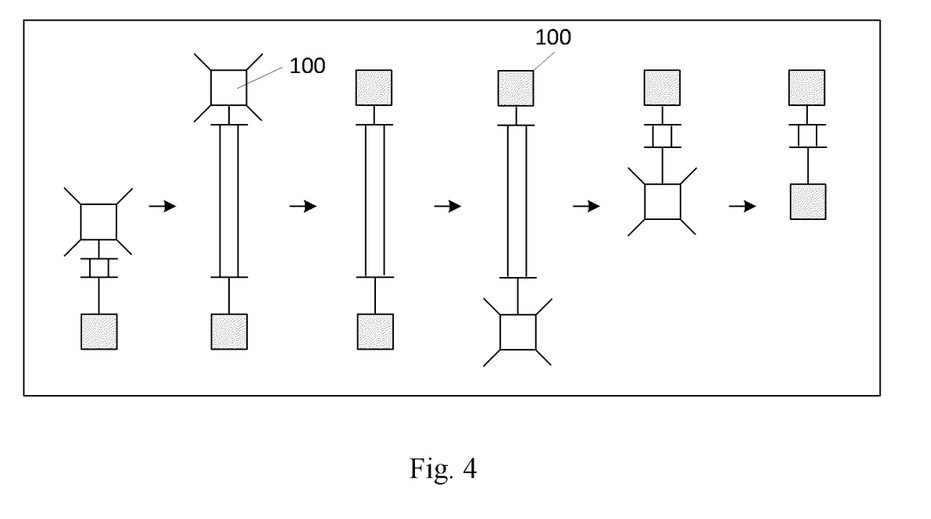
FIG. 4 illustrates a complete climbing gait of a gripping device according to one embodiment of the present application (moving forward).

The locomotion of the device as described in the above is similar to inchworms which is a kind of biped locomotion. FIG. 4 shows a complete climbing gait of the locomotion. It is composed of a plurality of (for example, six) climbing steps. The square colored in grey represents the closed gripper that is attached on the substrate while the square colored in white represents the opened gripper that detached on the substrate. The order of motion in the figure represents the locomotion of moving forward. The locomotion of moving backward is just in reverse order.

Figure 5:
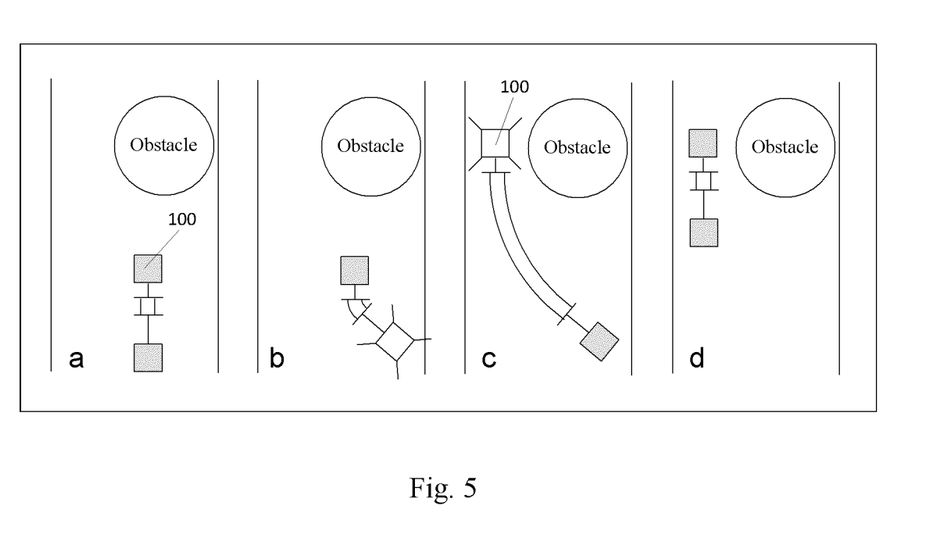
FIG. 5 illustrates a part of climbing motions to avoid an obstacle on a tree.

The device 1000 is able to change a moving direction in three-dimensional space by bending the continuum manipulator. It allows the device 1000 to climb along a curved shape of tree or avoid obstacles such as non-passing through branches. This ability makes the device 1000 have high maneuverability that surpass the existing tree climbing robots. FIG. 5 shows part of climbing motions to avoid an obstacle on a tree. The device 1000 can first adjust the direction of the bottom gripper and then climb along this direction to avoid the obstacle. This method is also applicable for turning to another side on a branch or selecting a branch to climb.

B. Control of the Device 1000

In this state, the device 1000 is a remote control robot. The control input of the gripper is simply an on/off command to make grippers fully open or close. As for the control of the continuum manipulator, since it has three DOF, three channels of input are needed. One way is to directly input the length of each spring. However, it is not an intuitive way for human manipulation. Human being always has a perspective of the direction of motion when controlling something, i.e., the concept of left, right, front and back. As a result, to make an intuitive controller, we define three control inputs, i.e., $S_{input}$, $\kappa_{input}^{FB}$ and $\kappa_{input}^{LR}$. $S_{input}$ controls the length of virtual backbone, $\kappa_{input}^{FB}$ controls the magnitude of front and back bending while $\kappa_{input}^{LR}$ controls the magnitude of left and right bending. The concept of front is defined as the direction of positive x-axis while the concept of left is defined as the direction of positive y-axis. The mapping from the control inputs to the posture of the continuum manipulator are:

$$\begin{bmatrix} S \\ \kappa \\ \phi \end{bmatrix} = \begin{bmatrix} S_{input} \\ \min\left(\sqrt{{\kappa_{input}^{FB}}^2 + {\kappa_{input}^{LR}}^2}, \kappa_{max}\right) \\ \mathrm{atan2}(\kappa_{input}^{LR}, \kappa_{input}^{FB}) \end{bmatrix}$$

where $$S_{input} \in [0, S_{max}]$$

and $$\kappa_{input}^{FB}, \kappa_{input}^{LR} \in [-\kappa_{max}, \kappa_{max}].$$

Experiments and Results

Numerous experiments have been conducted to evaluate the performance of the device 1000 in different aspects, i.e., Gripping force of the tree gripper, Climbing on different species of trees; Transition motion; Turning motion; and Slope climbing.

1) Gripping Force of the Tree Gripper

In the experiments, the gripper first gripped the tree without any external force being applied. An external pull-out force was then applied normal to the gripping surface to test how much force was needed to pull the gripper out of the tree. The maximum pull-out force was limited to 40N to avoid breaking the gripper. Eighteen types of trees with different surface curvatures were tested. The curvature of the trees, bark textures, and the maximum pull-out force with different gripping orientations are summarized in Table 2. In the table, O1, O2, and O3 represent gripping different orientations, respectively. The curvature of tree (C) may be obtained by:

$$C = \frac{1}{D/2}$$

where D is the diameter of tree.

Table 2 shows that on the first ten types of trees (No. 1-10), the performance was excellent. The gripper was able to generate over 40N of pull-in force in any gripping orientation. However, the results also reveal that the gripper does not work well on some types of trees, and particularly those with bark that peels off easily. In such cases, when a large pull-out force was applied, the gripper was pulled out as the bark peeled off (No. 11-15). Further, for soft trees the pull-out force broke the bark (No. 16-18).

The experimental results indicate that on most of the trees, the maximum pull-in force of the gripper in all gripping orientations is similar, and matches the analytical results as reported. The only exception is tree No. 13. This is because the bark of this tree peels off easily and its surface is not smooth, but rather has many vertical grooves. Gripping orientation will be better if it can create a pair of claws oriented perpendicular to the vertical groove, which allows the claws to penetrate deeper into the tree to generate a larger force.

As mentioned previously, the gripping curvature affects the pull-in force of the gripper. This phenomenon is clearly demonstrated by the experimental result for tree No. 10, where the generated pull-in force with a 6.2 m$^{-1}$ surface curvature is larger than that with a 4.8 m$^{-1}$ surface curvature. However, the result for tree No. 11 does not match the analytical result. This is because the tree with a 6.0 m$^{-1}$ surface curvature was older, and its bark will be peeled off easily, whereas the tree with a 11.2 m$^{-1}$ surface curvature was younger and its bark will not be peeled off easily.

In the experimental results, and especially those for trees No. 16-18, it is clear that using gripping orientation 3 generates the largest pull-in force, which matches the analytical results.

TABLE 2

Maximum pull-in force on different types of trees.

| No. | Trees | Texture | C (m$^{-1}$) | Pull-in force (N) | | |
| --- | --- | --- | --- | --- | --- | --- |
| | | | | O1 | O2 | O3 |
| 1 | Bombax malabaricum | Rough | 4.4 | >40 | >40 | >40 |
| 2 | Acacia confuse | Smooth | 5.6 | >40 | >40 | >40 |
| 3 | Ficus microcarpa | Smooth | 4.6 | >40 | >40 | >40 |
| 4 | Livistona chinensis | Fissured | 8.4 | >40 | >40 | >40 |
| 5 | Callistemon viminalis | Ridged and Furrowed | 6.3 | >40 | >40 | >40 |
| 6 | Bauhinia variegata var. candida | Smooth | 8.1 | >40 | >40 | >40 |
| 7 | Bauhinia variegate | Smooth | 8.8 | >40 | >40 | >40 |
| 8 | Araucaria heterophylla | Banded | 7.2 | >40 | >40 | >40 |
| 9 | Bauhinia blakeana | Smooth | 6.7 | >40 | >40 | >40 |
| 10 | Roystonea regia | Smooth, shallowly fissured | 6.2 4.8 | >40 15 | >40 15 | >40 20 |

TABLE 2-continued

Maximum pull-in force on different types of trees.

| No. | Trees | Texture | C (m⁻¹) | Pull-in force (N) O1 | O2 | O3 |
|---|---|---|---|---|---|---|
| 11 | *Taxodium distichum* | Fibrous, exfoliating | 11.2<br>6.0 | 29<br>12 | 30<br>10 | 30<br>10 |
| 12 | *Casuarina equisetifolia* | Slightly exfoliating | 6.9 | 11 | 13 | 12 |
| 13 | *Cinnamomum camphora* | Ridged and furrowed, exfoliating | 5.2 | 20 | 12 | 5 |
| 14 | *Khaya senegalensis* | Blocky, exfoliating | 4.0 | 10 | 10 | 10 |
| 15 | *Melaleuca quinquenervia* | Sheeting, exfoliating, soft | 4.5 | 5 | 5 | 5 |
| 16 | *Delonix regia* | Smooth | 6.7 | 24 | 24 | 25 |
| 17 | *Mangifera indica* | Shallowly fissured | 4.1 | 20 | 22 | 25 |
| 18 | *Eucalyptus citriodora* | Smooth, soft | 4.1 | 18 | 16 | 20 |

2) Climbing on Different Species of Trees

The tree climbing tests have been implemented on thirteen species of trees. The device 1000 is commanded to perform vertical climb up motion. The species of trees, diameters and the number of total trials and successful climbing gaits are summarized in Table 3. Results show that the device 1000 performs well on a wide variety of trees. It can be noticed that the range of successful climbing diameter of tree is wide, from 64 mm to 452 mm. However, the device 1000 will fail on several species of trees, i.e., *Melaleuca quinquenervia, Cinnamomum camphora* and *Bambusa vulgaris* var. *Striata*. The reason of fail climbing on *Bambusa vulgaris* var. *Striata* is that the tree surface is very hard that the spine on gripper is difficult to penetrate. As for the *Melaleuca quinquenervia* and *Cinnamomum camphora*, their barks can be peeled off easily. By the experimental results, it can be concluded that the device 1000 performs well on the trees that the surfaces are not very hard and have less exfoliation.

TABLE 3

Climbing performance on different species of trees

| Tree | Diameter (mm) | No. of steps (Success/Total) |
|---|---|---|
| *Bombax malabaricum* | 452 | 20/20 |
| *Callistemon viminalis* | 315 | 20/20 |
| *Delonix regia* | 309 | 20/20 |
| *Bauhinia blakeana* | 80, 207 | 20/20 |
| *Bauhinia variegate* | 258 | 20/20 |
| *Roystonea regia* | 325 | 20/20 |
| *Acacia confuse* | 229 | 20/20 |
| *Grevillea robusta* | 159 | 20/20 |
| *Bambusa ventricosa* | 64, 95 | 20/20 |
| *Araucaria heterophylla* | 277 | 20/20 |
| *Cinnamomum camphora* | 210, 293 | 13/20 |
| *Bambusa vulgaris* var. *Striata* | 99 | 1/5 |
| *Melaleuca quinquenervia* | 446 | 0/5 |

3) Transition Motion

In order to verify the maneuverability of the device 1000, a transition motion from a trunk to a branch has been tested. An experiment has been implemented on a *Bauhinia blakeana*. The diameter of the initial gripping trunk is 280 mm and the slope is about 45 degrees while the diameter of the target gripping branch is 118 mm and the slope is about 90 degrees. It shows that the device 1000 succeeded to leave the trunk and completely climbed on the branch. This transition motion takes three climbing gaits within three minutes.

4) Turning Motion

A turning motion has also been performed to evaluate the maneuverability of the device 1000. The experiment was implemented on a trunk of a *Bauhinia blakeana* with diameter 207 mm. From the experiment, it can be seen that the device 1000 moved from the front side to the back side. This motion takes five climbing gaits around five minutes. The compliance was succeeded to make the gripper normal to the tree surface so that the device 1000 can perform the turning motion successfully.

5) Slope Climbing

This experiment examined the maximal climbing slope of the tree climbing robot. It has been implemented on a *Bauhinia blakeana* with diameter 172 mm. The climbing angle is about 103 degrees. It can be seen that the device 1000 climbed up the tree successfully. There is no over slope climbing effect appeared in the experiment.

While the present application has been illustrated by the above description and embodiments or implementations, it is not intended to restrict or in any way limit the scope of the appended claims hereto.

What is claimed is:

1. A gripping device comprising:
    a house;
    at least one first phalanx linked to the house at a first joint;
    at least one second phalanx linked to the first phalanx at a second joint, wherein there is provided a first pre-compressed spring and a second pre-compressed spring in the first and the second joint, respectively; and
    a linear motor arranged on the house,
    wherein the linear motor is configured to further compress the first spring and release the second spring so as to push the second phalanx off a gripping substrate when the linear motor extends, and to compress the second spring and release the first spring so as to push the second phalanx back to the gripping substrate when the linear motor contracts.

2. The gripping device of claim 1, wherein the gripper device comprises a plurality of the first phalanxes and a plurality of the second phalanxes, wherein two of the first phalanxes and two of the second phalanxes are arranged to cooperate as a claw.

3. The gripping device of claim 2, wherein each of the second phalanxes is configured with a plurality of surgical suture needles at its tip, and when the linear motor contracts, the second compressed spring generates a force to push the claws back to the gripping substrate and the second spring is further compressed, such that the needles penetrate the gripping substrate.

4. The gripping device of claim 1, further comprising a manipulator configured to control the linear motor to extend or contract.

5. The gripping device of claim 4, wherein the manipulator comprises:
    a plurality of plates;
    a plurality of the third springs arranged to pass though the plates; and
    a plurality of actuators mounted in one of the plates, wherein each of the actuators includes a motor to control lengths of the third springs between each two of the plates independently, such that the manipulator performs bending and extension motions.

6. The gripping device of claim 5, wherein the actuators are configured to cooperate with the third springs such that the manipulator manipulates the bending and extension motions in a plurality of Degree of Freedom (DOF).

7. The gripping device of claim 5, further comprising a plurality of passive spacers arranged at middle of the manipulator to ensure that the springs are in constant distance through the entire manipulator.

8. The gripping device of claim 1, further comprising:
a pushing plate mounted at an end of the linear motor,
wherein during extension of the linear motor, the linear motor pushes the plate to make the first phalanx move upward, such that the first pre-compressed spring is further compressed and the second pre-compressed spring is released, and
wherein during the contraction of the linear motor, the linear motor pulls the plate to make the first phalanx move back such that the second pre-compressed spring is further compressed and the first pre-compressed spring is released.

* * * * *